(12) United States Patent
Kaesgen

(10) Patent No.: US 6,631,607 B1
(45) Date of Patent: Oct. 14, 2003

(54) ZERO TURN TRACTOR WITH FRONT MOUNTED ENGINE

(75) Inventor: Hartmut Kaesgen, Berea, OH (US)

(73) Assignee: MTD Products Inc, Valley City, OH (US)

(*) Notice: Subject to any disclaimer, the term of this patent is extended or adjusted under 35 U.S.C. 154(b) by 0 days.

(21) Appl. No.: 09/580,245

(22) Filed: May 26, 2000

Related U.S. Application Data

(60) Provisional application No. 60/154,061, filed on Sep. 16, 1999.

(51) Int. Cl.⁷ .................. A01D 34/03; A01D 34/43; A01D 34/64
(52) U.S. Cl. ............... 56/14.7; 56/22; 180/374
(58) Field of Search ................ 56/14.7, 16.7, 56/DIG. 22, 14.8; 180/374, 337, 371, 344, 6.2; 280/24, 78, 93.513, 93.514

(56) References Cited

U.S. PATENT DOCUMENTS

| | | | |
|---|---|---|---|
| 4,399,882 A | 8/1983 | O'Neill et al. | 180/6.48 |
| 4,616,724 A | 10/1986 | Lemke | 180/6.48 |
| 4,977,733 A * | 12/1990 | Samejima et al. | 56/14.7 |
| 5,113,819 A * | 5/1992 | Murakawa et al. | 123/198 E |
| RE34,057 E | 9/1992 | Middleworth | 180/6.2 |
| 5,168,970 A | 12/1992 | Hough et al. | 192/4 R |
| 5,207,187 A * | 5/1993 | Kurohara et al. | 123/41.7 |
| 5,214,906 A * | 6/1993 | Saki et al. | 56/320.2 |
| 5,383,528 A | 1/1995 | Nicol | 180/6.2 |
| 5,447,321 A * | 9/1995 | Hurlburt et al. | 280/97 |
| 5,502,957 A | 4/1996 | Roberston | 56/11.9 |
| 5,600,944 A | 2/1997 | Wright et al. | 56/14.7 |
| 5,644,903 A | 7/1997 | Davis, Jr. | 56/10.8 |
| 5,649,606 A | 7/1997 | Bebernes et al. | 180/307 |
| 5,653,466 A | 8/1997 | Berrios | 280/760 |
| 5,660,244 A * | 8/1997 | Matsuda | 180/68.1 |
| 5,667,032 A * | 9/1997 | Kamlukin | 180/256 |
| 5,894,907 A * | 4/1999 | Peter | 180/374 |
| 6,129,164 A * | 10/2000 | Teal et al. | 180/6.2 |
| 6,185,920 B1 * | 2/2001 | Oxley | 56/14.7 |
| 6,244,370 B1 * | 6/2001 | Peter | 180/374 |
| 6,257,357 B1 * | 7/2001 | Teal et al. | 180/6.2 |
| 6,325,396 B1 * | 12/2001 | Romig | 280/98 |
| 6,354,388 B1 | 3/2002 | Teal et al. | |

FOREIGN PATENT DOCUMENTS

| | | | | |
|---|---|---|---|---|
| EP | 0262285 | 4/1988 | | 34/86 |
| EP | 0532068 | 3/1993 | | 34/70 |
| EP | 0578884 | 1/1994 | | 5/4 |
| FR | 2722641 | 7/1995 | | |
| JP | 4-166422 | * | 4/1992 | B60K/11/06 |

* cited by examiner

Primary Examiner—Árpád Fábián Kovács
(74) Attorney, Agent, or Firm—Brouse McDowell; Roger D. Emerson; Timothy D. Bennett

(57) ABSTRACT

A riding lawn mower having zero turn capabilities has the engine mounted on the front of the frame. A drive system includes first and second hydrostatic transmissions for use in driving the back wheels. A grass bag may be mounted to the back portion of the frame and provides a counter balance to maximize the weight distribution. A discharge chute transfers cut vegetation from a mower deck to the grass bag and provides rear center discharge.

5 Claims, 3 Drawing Sheets

ZERO TURN TRACTOR WITH FRONT MOUNTED ENGINE

This Utility Patent Application claims priority from Provisional Patent Application Serial No. 60/154,061 filed Sep. 16, 1999.

BACKGROUND OF THE INVENTION

1. Field of Invention

This invention pertains to the art of methods and apparatuses for zero turn tractors, and more specifically to methods and apparatuses for a zero turn tractor having an engine mounted to the front portion of the frame.

2. Description of the Related Art

Tractors having zero radius turning capabilities are now well known in the art. They are often known as "zero turn" tractors. Typically such tractors have two drive wheels, one on each side of the tractor, and two driving controls, each of which controls one of the drive wheels. To make a zero radius turn it is necessary to drive one of the drive wheels in a forward direction while simultaneously driving the other drive wheel in a reverse direction. The desirability of such zero turn tractors continues to grow. However, one disadvantage, at least to some users, is that known zero turn tractors have engines mounted on the back of the tractor frame. This may be undesirable to some users who prefer to have the engine mounted to the front of the tractor.

Another problem with known zero turn tractors is related to the required weight distribution. Ideally, the longitudinal center of gravity is positioned over the axis of the back drive wheels—the center of rotation for a zero radius turn. This permits zero radius turns to be made most efficiently. Know tractors having zero radius turning capabilities are "back heavy." By back heavy it is meant that known zero turn tractors place the engine in the back portion of the tractor—rearward of the center of rotation. This requires counterbalancing of weight toward the front portion of the tractor in order to maintain the longitudinal center of gravity at the center of rotation. This leads to two known problems. First, the operator seat is typically positioned forward of the back wheel axle. Although this works well for its intended purpose, ideally the operator seat (and thus the operator) is placed over the center of rotation to minimize the torque felt by the operator during a zero radius turn. Often, however, moving the operator forward is still not enough counterbalance. Thus, the second known problem is to have to provide additional weight toward the front portion of the tractor. This weight is known as "dead weight" because its purpose is simply to counterbalance the engine weight. This extra weight is otherwise undesirable because it makes the tractor less efficient and more expensive.

The present invention provides a zero turn tractor having the engine placed forward of the operator seat. This permits the operator to be positioned substantially over the tractor's center of rotation. This also removes the need for dead weight. The difficulties inherit in the art are therefore overcome in a way that is simple and efficient while providing better and more advantageous results.

SUMMARY OF THE INVENTION

According to one aspect of this invention, a riding lawn mower has a frame with a pair of front wheels and a pair of back wheels operatively connected to the frame. The mower also includes a mower deck mounted to the frame and an engine to the front portion of the frame. A drive system is used to provide power from the engine to the back wheels. This drive system provides zero turn capabilities.

According to another aspect of this invention the mower may also include a grass bag mounted to the back portion of the frame. A discharge chute transfers cut vegetation from the mower deck to the grass bag. This provides for a rear center discharge mower having zero turn capabilities.

One advantage of the present invention is that it is easy to manufacture and can be made economically.

Another advantage of the present invention is that the need for dead weight to counter balance a rear mounted engine has been eliminated.

Another advantage of this invention is that the operator is positioned on the center of rotation for zero radius turns.

Still another advantage of this invention is that the grass bag acts as a useable counter weight.

Yet another advantage of this invention is that a zero turn tractor is provided with a rear center discharge.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
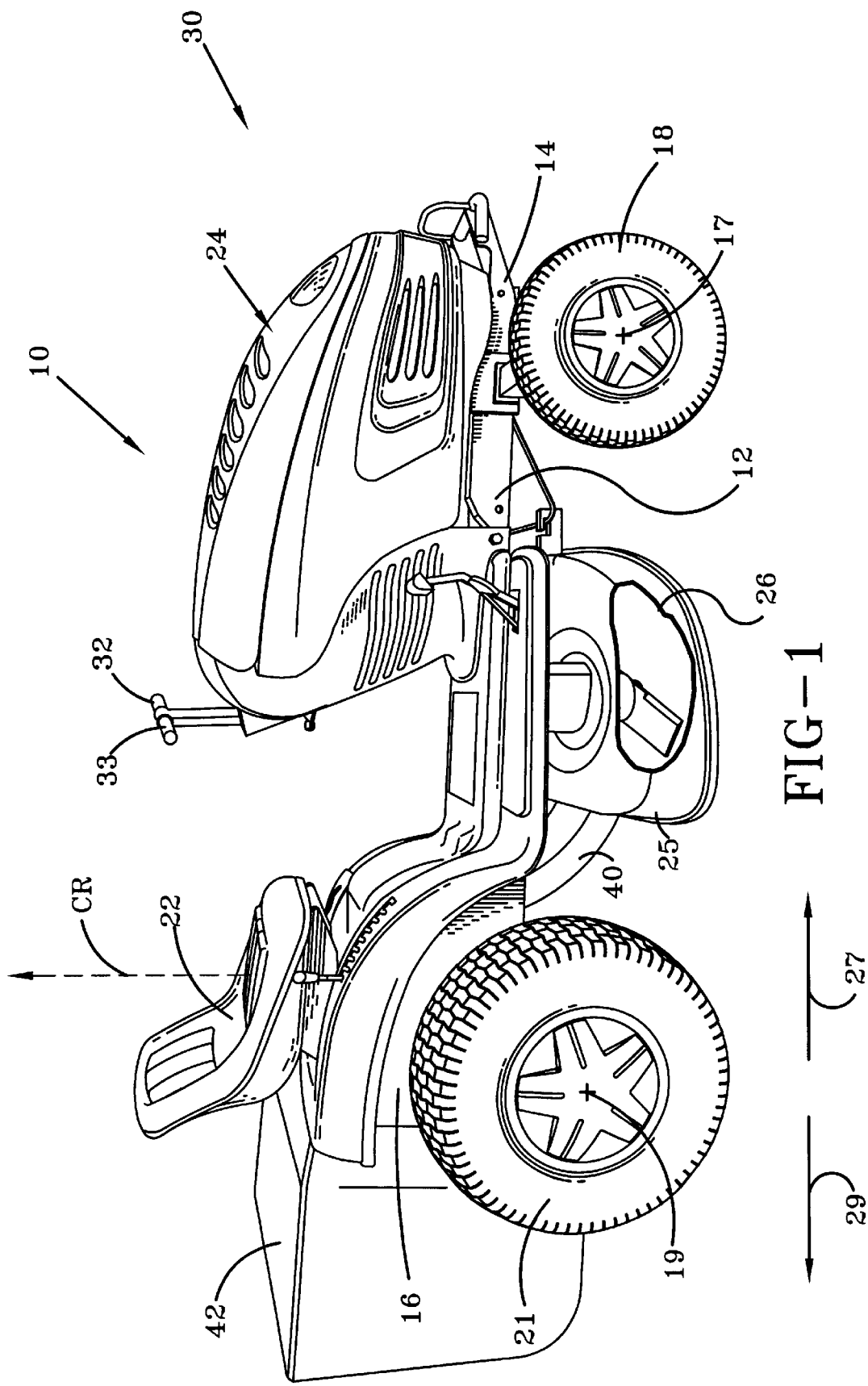
FIG. 1 is a side of a riding mower incorporating the features of this invention.
Figure 2:
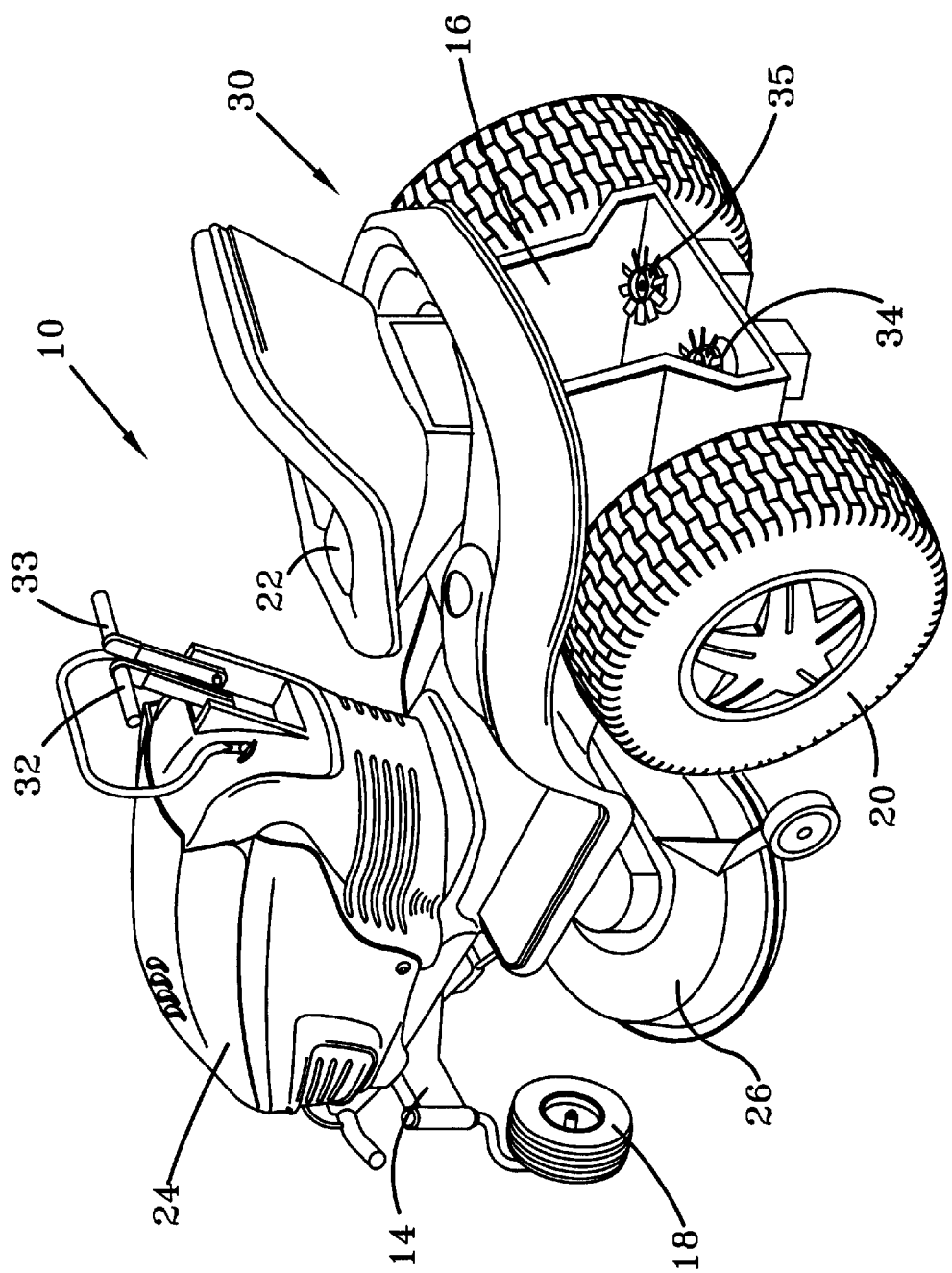
FIG. 2 is a perspective rear view of the mower of FIG. 1 shown with the grass bag removed.

Referring now to the drawings wherein the showings are for purposes of illustrating a preferred embodiment of the invention only and not for purposes of limiting the same, FIGS. 1–2 shows a lawn and garden tractor 10 according to this invention. The preferred embodiment is directed to a lawn and garden tractor but the invention is applicable to other mowers, other vehicles, and other applications as well. The tractor 10 includes a frame 12 having front and back portions 14, 16 with front wheels 18 operatively mounted to the front portion 14 and back wheels 20, 21 operatively mounted to the back portion 16. Preferably, the front wheels 18 are castor wheels to freely permit the front of the tractor 10 to pivot about the center of rotation CR during a zero radius turn. Though a pair of front wheels 18 are preferred, only a single front wheel is required for this invention. The back wheels 20, 21 are used as drive wheels to provide locomotion for the tractor. Both back wheels 20, 21 can be selectively driven in forward and rearward directions as will be disclosed further below.

With continuing reference to FIGS. 1–2, the tractor also includes an operator seat 22 and an engine 24 both mounted to the frame 12. A drive system 30 is used to provide power from the engine 24 to the back wheels 20, 21. The engine is also used to rotate one or more cutting blades (not shown) within a mower deck 26 that is supported from the frame 12.

The operation of the cutting blades is well known in the art and thus will not be discussed further in this specification. The drive system 30 can be used to drive either back wheel in a first direction (for example, the first back wheel 20 in forward direction 27) and the other back wheel in a second direction (for example, the second back wheel 21 in backward direction 29). When the back wheels 20, 21 are driven in such opposite directions, the tractor 10 makes a zero radius turn. What is especially to be noted is that the engine 24 is mounted to the front portion 14 of the frame 12 and provides power to the drive system 30 providing zero turn capabilities. This is believed to be a first in the industry. It should also be noted that the engine 24 is positioned fully forward of the operator seat 22. By fully forward it is meant that every component of the engine 24 is positioned forward (toward forward direction 27) of every component of the operator seat 22.

Figure 3:
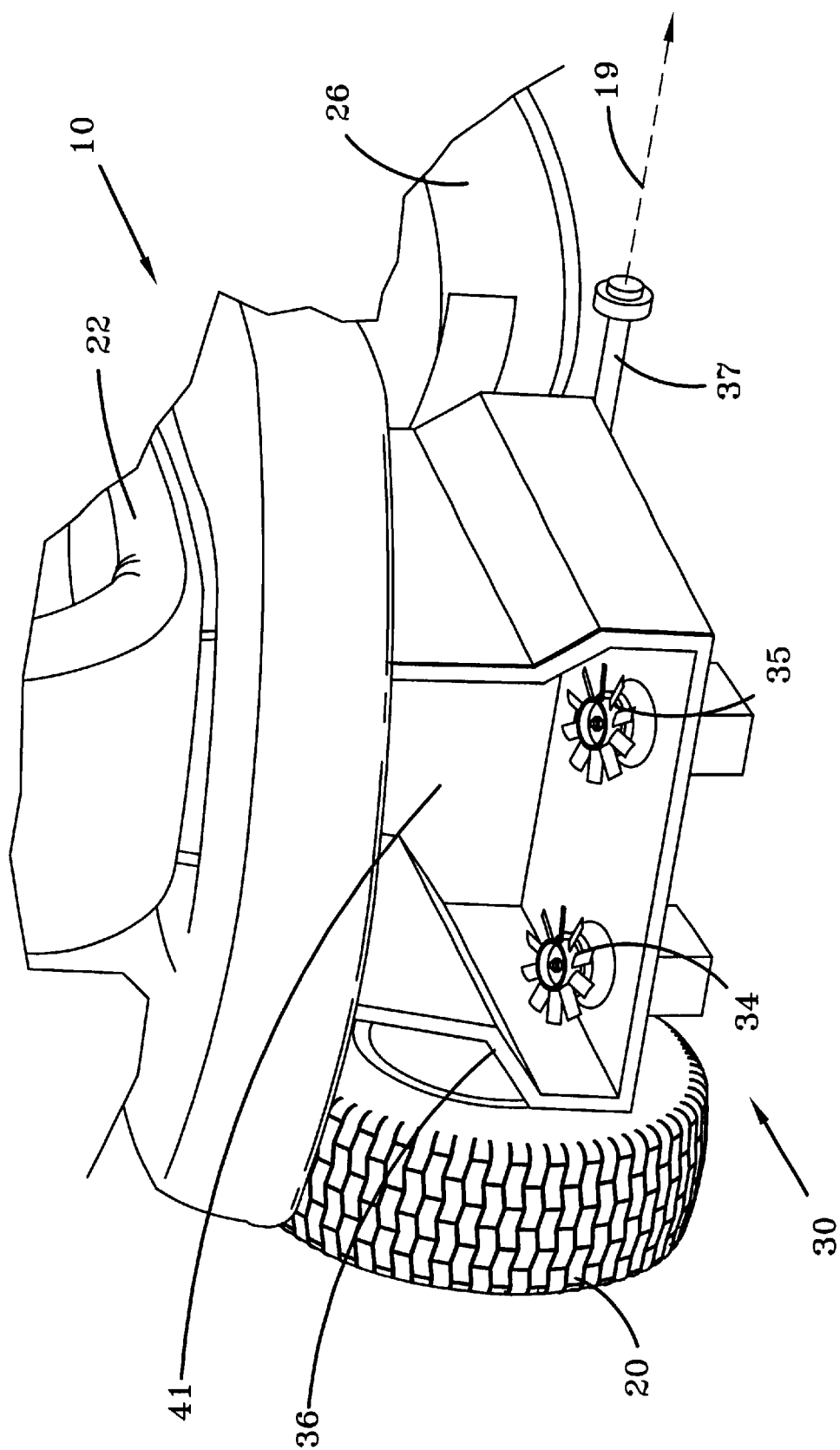
FIG. 3 is a back view of the mower of FIG. 1 showing the grass bag, the discharge chute and the right rear back wheel removed to illustrate the chute opening.

With reference now to FIGS. 1–3, the drive system 30 includes a pair of driving controls 32, 33 that are used to independently control the direction and speed of the first and second drive wheels 20, 21 respectively. It should be noted that any drive system 30, including any type of transmission, that provides variable speed drive in forward and reverse (first and second) directions can be used with this invention. However, in the preferred embodiment the drive system 30 also includes first and second hydrostatic transmissions 34, 35. The hydrostatic transmissions 34, 35 each selectively rotating first and second drive axles (only second axle 37 is visible but the first axle 36 is similar in design) respectively that are operatively connected to the first and second back wheels 20, 21 respectively. The drive axles 36, 37 are co-linear with the axis 19 of the back wheels 20, 21. The inner workings of hydrostatic transmissions are well known in the art and thus will not be discussed here in detail. The driving controls 32, 33 are operatively connected to the hydrostatic transmissions 34, 35 respectively. Thus, to adjust the speed, direction and turning of the tractor 10, the operator only needs to adjust the driving controls 32, 33 as desired. What is especially to be noted is that the operator seat 22 is mounted both substantially in the side to side middle of the tractor 10 and substantially over the drive axles 36, 37 (thus also over the axis 19). Thus, the operator seat 22 (and the operator when using the seat 22) is positioned substantially on the center of rotation CR of the tractor 10 when experiencing a zero radius turn. This is believed to be a first in the industry.

With continuing reference to FIGS. 1–3, the tractor 10 may also include a discharge chute 40 for use in transferring cut vegetation (not shown) from the mower deck 26 to a grass bag 42. As shown, the grass bag 42 is mounted to the back portion 16 of the frame 12. As also shown, the discharge chute 40 is operatively connected to the back end 25 of the mower deck 26 substantially at the mower deck's side to side center. For this reason the tractor 10 shown may be considered a rear center discharge riding mower. FIG. 3 shows a back view of the tractor 10 with the second back wheel 21, the grass bag 42 and the discharge chute 40 removed. What can be seen in FIG. 3 is a chute opening 41 through which the discharge chute 40 extends. It is especially to be noted that the discharge chute 40 passes fully beneath the operator seat 22 and at least partially between the first and second hydrostatic transmissions 34, 35. By fully beneath it is meant that over the longitudinal length of the tractor 10 that coincides with the longitudinal length of the operator seat 22, every portion of the discharge chute 40 is positioned below the operator seat 22. Preferably, the discharge chute 40 passes fully above the first and second drive axles 36, 37 and fully between said first and second back wheels 20, 21. By fully above it is meant that over the longitudinal length of the tractor 10 that coincides with the longitudinal length of the drive axles 36, 37, every portion of the discharge chute 40 is positioned, above the drive axles 36, 37. By fully between it is means that over the longitudinal length of the tractor 10 that coincides with the longitudinal length of the back wheels 20, 21, every portion of the discharge chute 40 is positioned between the back wheels 20, 21. This positioning of tractor 10 components provides for a very direct (non-tortuous) route for the discharge chute 40 while permitting the discharge chute 40 to maintain a relatively large cross sectional area throughout its length. A rear center discharge riding mower having zero radius turning capabilities is believed to be a first in the industry.

With reference now to FIG. 1, the weight distribution of the inventive tractor 10 will now be further discussed. As noted above, known zero turn tractors are back heavy. In other words, known zero turn tractors have longitudinal centers of gravity (discounting operator weight) that are positioned closer to an axis of the back wheels that to an axis of the front wheels. This weight distribution problem with known zero turn tractors is compounded when a rear mounted grass bag is used because the back heaviness is only increased. The tractor 10 of this invention, on the other hand, has a longitudinal center of gravity (discounting operator weight) that is positioned closer to an axis 17 of the front wheels 18 than to the axis 19 of the back wheels 20, 21. This eliminates the need to move the operator seat 22 forward of the center of rotation CR and also eliminates the need to add dead weight to the front portion 14 of the frame 12. With this in mind, it should be noted that the grass bag 42 serves not only to collect cut vegetation but also as useful (as opposed to dead) counter weight (rearward of the back wheel axis 19) to position the center of gravity substantially at the center of rotation CR. Thus, while rear mounted grass bags make known zero turn tractors even farther out of weight balance, the grass bag 42 mounted to the tractor 10 of this invention acts as a counterbalance to improve the weight distribution.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

What is claimed is:

1. A vehicle comprising:
   a frame having front and back portions;
   at least a first front wheel operatively mounted to said front portion of said frame;
   first and second back wheels operatively mounted to said back portion of said frame;
   an engine operatively mounted to said front portion of said frame;
   a drive system for use in providing power from said engine to said first and second back wheels, said drive system adapted to selectively drive said first back wheel in a first direction while simultaneously driving said second back wheel in a second direction thereby providing zero turn capabilities;
   a mower deck including at least a first cutting blade and operatively connected to said frame, said engine providing power to rotate said at least first cutting blade;
   an operator seat mounted to said frame, said engine being positioned fully forward of said operator seat; and, a discharge chute operatively connected to said mower deck, wherein said discharge chute passes fully beneath said operator seat.

2. The vehicle of claim 1, wherein said discharge chute passes fully between said first and second back wheels.

3. The vehicle of claim 2 further comprising:

said drive system including first and second hydrostatic transmissions for use in driving said first and second back wheels respectively; and, a grass bag mounted to said back portion of said frame.

4. The vehicle of claim 3 wherein said first and second hydrostatic transmissions have first and second drive axles respectively operatively connected to said first and second back wheels respectively, said discharge chute passing fully above said first and second drive axles.

5. The vehicle of claim 4 wherein said at least a first front wheel comprises:

first and second front castor wheels.

* * * * *